United States Patent [19]

Naffziger

[11] 4,360,379

[45] Nov. 23, 1982

[54] PROCESS FOR THE REMOVAL OF RUST FROM CAST IRON BORINGS AND THE LIKE IN PREPARATION FOR MELTING

[76] Inventor: Dewein H. Naffziger, P.O. Box 1029, Trumbull County, Warren, Ohio 44482

[21] Appl. No.: 148,651

[22] Filed: May 12, 1980

[51] Int. Cl.³ .............................................. C21C 5/42
[52] U.S. Cl. ......................................... 75/43; 75/13; 75/44 S; 209/20; 209/144
[58] Field of Search ................... 75/12, 13, 43, 44 R, 75/44 S; 209/20, 144

[56] References Cited

U.S. PATENT DOCUMENTS

| | | | |
|---|---|---|---|
| 2,294,920 | 9/1942 | Lykken | 209/144 |
| 4,162,156 | 7/1979 | Naffziger | 75/44 S |
| 4,209,321 | 6/1980 | Harvey et al. | 75/44 S |

*Primary Examiner*—M. J. Andrews
*Attorney, Agent, or Firm*—J. H. Slough

[57] ABSTRACT

Process and means for the removal of iron rust from cast iron borings or chips to prepare the same for melting. The process involves the heating and agitation of such borings or chips, converting the rust of the same to magnetite and chemically uncombined water, eliminating the water from the chips or borings, screening the particles to remove the converted material, charging the balance of the substantially oxide free borings into a melting furnace, wherein the rate of the charge and the melting temperatures can be maintained substantially constant during the melting process to provide a uniform slag-free operation.

4 Claims, 1 Drawing Figure

U.S. Patent    Nov. 23, 1982    4,360,379
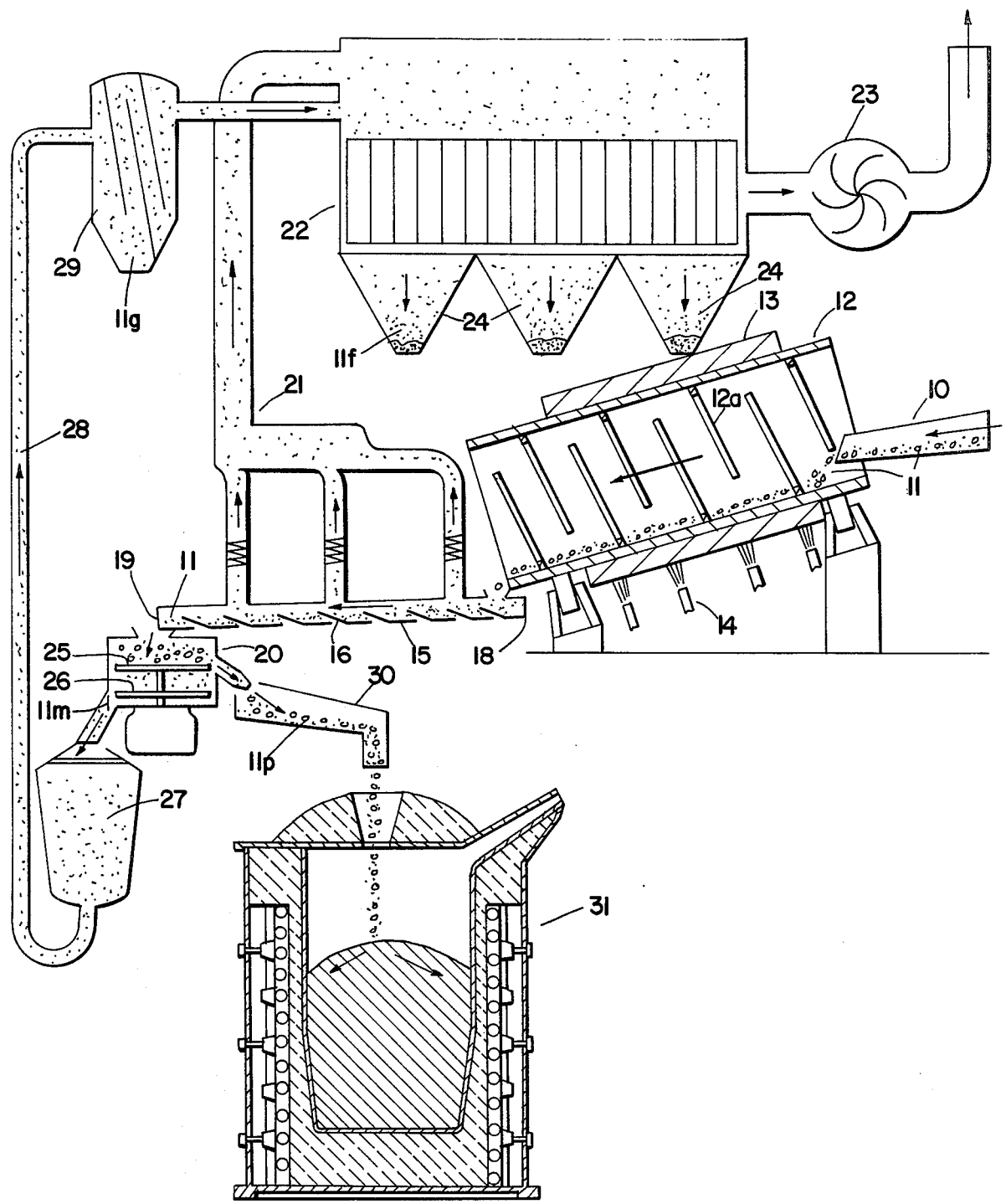

PROCESS FOR THE REMOVAL OF RUST FROM CAST IRON BORINGS AND THE LIKE IN PREPARATION FOR MELTING

This invention relates to the removal of rust from finely divided cast-iron particles, such as borings, chips and burnt turnings; more particularly it relates to improvements in the preparation of such chips, borings and turnings for melting.

This invention has particular application to the preparation of chips, borings and turnings prior to melting for use in the process set forth in my prior U.S. Pat. No. 4,162,156 or in other melting processes wherein at present ferric oxides are contained which result in the additional expenditure of energy, time, or money in their removal during melting.

It has been found that improvements in the melting of such borings etc. containing carbon and silicon in a coreless induction furnace according to the process of the hereinabove referred-to U.S. Pat. No. 4,162,156 can be obtained by first preheating the iron borings, etc. to a temperature of at least 608° Fahrenheit, whereby the rust on such borings is converted to ferrosoferric oxide and the chemically combined water is driven off, the borings etc. are cooled and separation of the minus 30 mesh particles from plus 30 mesh particles obtained, thus obtaining borings for charging which are free of oxide up to 1% content by weight. In the previously mentioned Letters Patent which teaches the control of dissolved oxygen in the melt below the Si-O equilibrium level for the operating temperature, the process control requires that, as the oxide content of the borings increases in relation to the metallic content, either the charge rate be reduced or the steady-state melting temperature be increased to increase the chemical reaction rate for the reduction of the oxide and to maintain a substantially slag-free operation.

Reduction of the charging rate in the said patented process reduces the melting rate which results in increased costs of operation since it reduces full utilization of the melting equipment at rated capacity. Increase in the melting temperatures results in higher heat losses and refractory consumption, both of which also contribute to higher operating costs.

It is an object of my invention, therefore, to provide an improved process and means for converting the said rust on cast iron borings to magnetite.

Another object of my invention is to provide an improved process and means for the removal of rust from iron borings, chips and turnings prior to melting the borings, etc. to effect a low oxide content in the melt.

Still another object of my invention is to provide by my improved means and process the cleansing of rusty cast iron borings of oxide prior to melting.

A further object of my invention is to provide a continuous process for preparing such borings for melting.

A still further object of my invention is to provide an improved process for the separation of the converted oxide from the metallics of the borings and to collect the same for other uses.

Another object of my invention is to achieve significant removal of the oxides in the borings prior to melting to achieve a considerable reduction in the energy required to melt the iron over that required in prior melting processes including the process of U.S. Pat. No. 4,162,156.

A further object of my invention is to achieve the foregoing objects in a highly efficient and economical manner.

Still further objects will become more readily apparent from a review of the specification which follows and from the appended claims.

The present invention involves means and a process for pretreating cast iron borings, etc. prior to melting of the same and involves the conversion of rust to magnetite and water and the subsequent separation of the magnetite and water from the metallics of the borings, etc. It involves the continuous feed of rusty borings, etc. into a rotating drier wherein the borings are brought to a minimum temperature of at least 608° F. and preferably 620° F., the same being agitated and tumbled by rotary movement of the drier to loosen the converted rust from the metallics of the borings and to expand the water vapor, produced in the conversion, from the drier along with any products of combustion produced from any contained oil on the borings; the mixture of metallic borings and magnetite is continuously moved through the drier to cooling means and then to a rotary screen for mechanically separating all minus 30 mesh materials from all plus 30 mesh materials. All minus 30 mesh materials containing converted rust in the form of magnetite ($Fe_3O_4$) along with minute metallic particles are collected and all plus 30 mesh materials are discharged from the screen and changed as substantially oxide free materials into a melting furnace.

In the drawings:

FIG. 1 is a schematic representation of a system according to the invention.

Referring to the drawings, in all of which like parts are designated by like reference characters, FIG. 1 illustrates the means and process for pretreating cast iron borings for use in a melting furnace. For the purpose of this description, cast iron borings, chips and turnings will be generically termed borings. These borings are generated daily as by-products in sizeable quantities in various machining operations performed on iron castings. When these are transferred, stored, shipped and handled under ordinary atmospheric conditions, they become highly oxidized and rust or chemically $Fe_2O_3.x$ ($H_2O$) coated.

As shown in the drawings, rusty and/or wet, and/or oily borings 11 are preferably fed from a stockpile of the same onto a vibrating conveyor 10 which is disposed adjacent a rotary drying unit 12 into said drier which is shrouded with an external firing chamber 13 heated by burners or the like 14. The drier or drum 12, which is adapted to rotate in either clockwise or counter-clockwise direction, is preferably disposed at a downwardly oblique or slanted position and assists in moving the borings charged into the same from the conveyor 10 and moved progressively therethrough assisted preferably by spiral metallic vanes 12a secured to the inner diameter of the drier or drum 12.

The borings are heated to a temperature of at least 608° F. and preferably 620° F. at which temperature the $Fe_2O_3.x$ $H_2O$ in the presence of iron (Fe) converts to $Fe_3O_4$, changes in color from a light reddish-brown (rust) color to a dark deep brown-black color, and the water chemically combined with the $Fe_2O_3$ passes off as water vapor. The heated and dried borings 11 are then discharged from the drier drum 12 onto cooling means, e.g. a vibrating conveyor 15 which cools the dried and heated borings by atmospheric air drawn through slots 16 located in the bottom of the conveyor 15 to a temperature preferably of less than 200° F. The borings are progressively moved forward on the vibrating conveyor 15 and inclined shelves 17 slanted upwardly in the direction of movement and provides for air flow through the openings 16 to the borings. The conveyor 15 has its rearwardly disposed end 18 lying beneath the discharge end of the drier and its opposite spaced end 19 above a rotary screening unit 20. The conveyor 15 is connected to upwardly disposed ductwork or piping 21 leading to a baghouse 22. Air movement created by a blower 23 through the baghouse 22 and ductwork 21 also cools the heated and dried borings 11 as they move along the conveyor 15 and minute metallic particles or fines 11$f$ comprised of $Fe_3O_4$ separated pneumatically from the dried borings 11 are collected in the baghouse 22 to be discharged after accumulation in the collection chambers 24 of the baghouse. The cooled dried borings 11 are discharged from the conveyor 15 onto the rotary screen unit 20 comprised, in the form of my invention shown herein, of a rotating 30 mesh screen 25 and a rotating pan 26. All minus 30 mesh materials 11$m$ comprised of relatively minute metallic particles 11$g$ and $Fe_3O_4$ 11$f$ pass through the screen 25 onto the rotating pan 26 and are discharged through an air transporter 27 transporting the minus 30 mesh material 11$m$ pneumatically through the piping 28 into a particle cyclone separator 29 where minute metallic particles 11$g$ are accumulated in the cyclone separator and separated from the minus 30 mesh material 11$m$. The balance of the $Fe_3O_4$ (11$f$) is drawn pneumatically into the baghouse 22 where it accumulates in the collection chambers 24, for further discharge and other purposes. All clean, dried, cooled and separated plus 30 mesh materials 11$p$ are discharged from the rotating 30 mesh screen onto transport means 30 and the same are charged into a melting furnace as shown at 31 at a rate used in the process set forth in U.S. Pat. No. 4,162,156 or a suitable rate in any other melting or briquetting operation where a low contained oxide content of the borings is desirable.

It has been found that by employing the present means and process to pretreat the rusty borings used in the processes referred to, that feeding and melting of the borings may be accomplished at the maximum power input and minimum energy consumption; that the removed oxide has commercial value to industries which consume iron oxide; that the operation of the process of the said Letters Patent can proceed without alteration of feed rate or temperature change.

I have conducted numerous and extensive temperature, time, and magnetic tests to determine at which temperature and time, rust or ferric oxide $Fe_2O_3.x(H_2O)$ reduces to ferrosoferric oxide ($Fe_3O_4$) and the chemically combined water $x(H_2O)$ acquired during storage, shipment, etc. by the ferric oxide is driven off.

In the course of such tests, samples of rusty borings were tumbled and minute particles of cast iron and rust drawn off the samples and collected in an air filter. The collected samples of cast iron and rust mixture were then heated in air to various temperatures ranging from 1800° F. down to room temperature. Magnetic tests were conducted on each sample after heating to determine if all particles were converted to a magnetic material. All samples tested from 1800° F. down to approximately 608° F. showed evidence of the non-magnetic rust being converted spontaneously and simultaneously with agitation and tumbling. Below 608° F. a time-temperature relationship was noted, requiring an increase in time at lower temperatures before conversion would take place during agitation and tumbling the test samples. No time-temperature relationship could be established below approximately 300° F. A sample of pure $Fe_2O_3$ (Hematite) was next obtained and despite repeated heating of the same to temperatures of 1800° F., no conversion of any particles to $Fe_3O_4$ occurred. Hematite ($Fe_2O_3$) was then mixed with minute iron particles and heated to 620° F. At substantially that temperature, the mixture was stirred and tumbled and a substantially spontaneous conversion of hematite to magnetite took place.

It was noted during the course of these experiments that the chemically combined water of the rust particles was driven off in the presence of iron at a temperature of appoximately 608° F. This occurs substantially simultaneously with the conversion of the $Fe_2O_3$ to $Fe_3O_4$ and is observed together with the equally simultaneous change in color from a light reddish-brown (rust color) to a dark deep brown-black color of the particles.

Several hundred pounds of dried borings were next hand screened through a 30 mesh screen and 50 mesh screen respectively to give three classifications; plus 30 mesh, plus 50—minus 30 mesh and minus 50 mesh. These classified particles were melted separately in an induction coreless furnace and fed at a melting rate determined by the maximum electrical power input available to the furnace. It was found that the plus 30 mesh material melted readily and produced little or no slag when operating above the $SiO_2$/CO inversion temperature as taught in U.S. Pat. No. 4,162,156. The plus 50 minus 30 mesh material produced slag in quantities equal to above 10% of the weight of the charged material. The minus 50 mesh material produced a large volume of gas, smoke, and slag. The slag was equivalent in weight to approximately 30% of the weight of material charged. Analysis of each heat of metal melted was made and the losses of both carbon and silicon were noted. Silicon losses were minimal for the plus 30 mesh material. Carbon losses were significant. The plus 50 minus 30 mesh material melted gave a high loss of both carbon and silicon. The minus 50 mesh material gave a high loss of carbon and a significantly higher loss of silicon of the molten heel of metal in the melting furnace. It was discovered during the test melts that the particles of borings in excess of 30 mesh size contained relatively small amounts (1% or less) of oxide content and only a minimal amount of the borings oxidized during the charging operation. It was apparent that the borings of particle size plus 50 mesh and minus 30 mesh either contained much higher levels of oxide than the plus 30 mesh sized particles or many of those metallic particles were oxidized during the charging operation. The minus 50 mesh material contained a large quantity of oxide and much of the minute metallic particles were oxidized during the charging operation.

Extensive studies were then made with random samplings of dried borings. It was determined from these studies that minus 30 mesh particles ranged from approximately 3% to as high as 15% of the sampled weight after they had been dried and cooled and subjected to air pollution facilities. This variation could be attributed to variation in the degree of oxidation (rusting) of the borings as received, and to an inconsistent pneumatic removal of $Fe_3O_4$ by the air pollution control equipment.

Based on these studies, I installed a rotary screen 25 along with a pneumatic transporter 27 and a particle cyclone separator 29 as illustrated in FIG. 1.

Borings were then heated in a borings drier such as drier 12 to a minimum 620° F. and a maximum of 1300° F. Samples of borings of plus 30 mesh particle size were screened and shown to contain 1% or less of minus 30 mesh particles. Separated particles of the minus 30 mesh material which accumulated in the particle cyclone separator 29 were found to be over 99% metallic. Separated particles of the minus 30 mesh material accumulated in a baghouse 22 were found to be in excess of 99% $Fe_3O_4$. With this system installed and with temperatures at least 608° F. and preferably 620° F. within the borings drier, conversion of $Fe_2O_3.x\ H_2O$ to $Fe_3O_4$ and water vapor was postively accomplished. The water vapor as stated above was extracted from the drier pneumatically along with products of combustion and the $Fe_3O_4$ and minute particles of metallic borings were positively separated by the rotary 30 mesh screen. Further separation of metallic and non-metallic particles were accomplished as stated above in the particle cyclone separator 29. Both the minus 30 mesh metallics 11g accumulated in the separator 20 and the $Fe_3O_4$ 11f accumulated in the collection chambers 24 of the baghouse 22 have commercial value.

The invention has been described in detail with particular reference to the preferred embodiment thereof, but it will be understood that numerous variations and modifications may be made therefrom however within the spirit and scope of the invention to those skilled in the art to which the invention appertains.

What I claim is:

1. A process for pretreating rusty cast iron borings and converting the rust from ferric oxide and chemically combined water to ferrosoferric oxide which comprises the steps of:
    (a) charging the rusty borings into a heated drier;
    (b) tumbling and heating the said borings to a temperature of at least 608° F. in said drier at which temperature conversion of the ferric oxide rust to ferrosoferric oxide rust occurs and the chemically combined water is driven off as water vapor and the converted rust loosened from the metallics of the borings;
    (c) cooling the borings;
    (d) screening the converted rust and borings and separating the same into two size screenings;
    (e) discharging the smaller of said screenings containing ferrosoferric oxide and metallic borings; and
    (f) transporting and charging the larger of said screened borings having a substantially oxide-free content into a melting furnace.

2. A process for removal of rust from rusty cast iron borings comprising the steps of:
    (a) raising the temperature of the rusty borings to a minimum temperature of 608° F. in a heated chamber;
    (b) agitating and tumbling the rusty borings in the said heated chamber at no less than 608° F. converting the $Fe_2O_4.x\ (H_2O)$ to $Fe_3O_4$ and water vapor;
    (c) removing the water vapor;
    (d) the converted rust $Fe_3O_4$ loosened from the metallics of the borings during such agitation and tumbling;
    (e) cooling the dried borings and converted rust $Fe_3O_4$;
    (f) separating minus 30 mesh particles of the borings and $Fe_3O_4$ from plus 30 mesh boring particles;
    (g) transporting and charging plus 30 mesh substantially oxide-free borings into a melting furnace.

3. A process for the removal of rust from cast iron borings comprising the steps of:
    (a) raising the temperature of the rusty borings to a minimum temperature of 608° F. in a heated chamber;
    (b) agitating and tumbling the rusty borings in a heated rotating chamber at no less than 620° F. for a minimum of one minute converting the $Fe_2O_3.x\ (H_2O)$ to $Fe_3O_4$ and water vapor;
    (c) removing the water vapor along with any products of combustion from the heated chamber;
    (d) the converted rust being loosened from the metallics of the borings during such agitation and tumbling;
    (e) cooling the dried borings and converted rust $Fe_3O_4$;
    (f) separating the minus 30 mesh particles of the borings and the converted rust $Fe_3O_4$ from the plus 30 mesh boring particles by screening through a 30 mesh screen;
    (g) separating the minus 30 mesh particles by means of a particle cyclone separator and baghouse collector into the classification of metallic borings and non-metallics converted rust $Fe_3O_4$ respectively.

4. A process as claimed in claim 1 wherein the borings are cooled in the cooling step to a temperature of at least substantially 200° F.

* * * * *

UNITED STATES PATENT AND TRADEMARK OFFICE
CERTIFICATE OF CORRECTION

PATENT NO. : 4,360,379
DATED : November 23, 1982
INVENTOR(S) : Dewein H. Naffziger It is certified that error appears in the above-identified patent and that said Letters Patent is hereby corrected as shown below:

Column 5, line 19, "were" should read ---was---.

Column 5, line 21, "20" should read ---29---.

Signed and Sealed this

First Day of March 1983

[SEAL]

Attest:

GERALD J. MOSSINGHOFF

Attesting Officer    Commissioner of Patents and Trademarks